United States Patent [19]

Meloy et al.

[11] Patent Number: 4,953,084
[45] Date of Patent: Aug. 28, 1990

[54] METHOD AND APPARATUS USING VARIABLE RANGES TO SUPPORT SYMBOLIC DEBUGGING OF OPTIMIZED CODE

[75] Inventors: Sue A. Meloy; Deborah S. Coutant, both of San Jose, Calif.

[73] Assignee: Hewlett-Packard Company, Palo Alto, Calif.

[21] Appl. No.: 121,311

[22] Filed: Nov. 16, 1987

[51] Int. Cl.$^5$ .............................................. G06F 11/00
[52] U.S. Cl. ...................................... 364/200; 371/19; 364/280; 364/280.4; 364/280.5; 364/267; 364/267.91
[58] Field of Search ... 364/200 MS File, 900 MS File, 364/200, 300, 900; 371/19

[56] References Cited

U.S. PATENT DOCUMENTS

| | | | |
|---|---|---|---|
| 4,462,077 | 7/1984 | York | 364/300 |
| 4,567,574 | 1/1986 | Saade | 364/900 |
| 4,589,068 | 5/1986 | Heinen, Jr. | 371/19 |
| 4,667,290 | 5/1987 | Goss et al. | 364/300 |
| 4,755,997 | 7/1988 | Takahashi | 371/19 |
| 4,819,234 | 4/1989 | Huber | 371/19 |

OTHER PUBLICATIONS

Interactive Source-Level Debugging of Optimized Programs by Polle Trescott Zellweger, Xerox Corporation, CSL-84-5, May 1984, pp. 72-74.
Research Report, Design of the FDS Interactive Debugging System, by Warren and Schlaeppi, IBM Thomas J. Watson Research Center, pp. 1-16.

Primary Examiner—Raulfe B. Zache
Attorney, Agent, or Firm—Roland I. Griffin; Alan H. Haggard

[57] ABSTRACT

A system uses variable ranges to support symbolic debugging of optimized code. A debug symbol table is constructed which includes descriptions of each user resource in source code. Additionally, a range table is constructed. The range table contains, for each user resource which is stored in numerous locations during execution of the code, a list of ranges and a description of where the user resource may be found during each range. If the user resource is stored as a constant during a particular range, the value of the constant may be stored in the range table. The description of each user resource in the debug symbol table includes a flag which indicates whether there is a list of ranges in the range table for a particular user resource. If there is, the description of the particular user resource will include a pointer to the list of ranges for that user resource.

10 Claims, 17 Drawing Sheets

```
106 ─ struct    DNTT_VAR (

100 ─ /*1*/     BITS                extension:    1;  ─107
                KINDTYPE    kind:         10; ─108
101 ─ /*1*/     BITS                public:       1;  ─109
102 ─ /*2*/     BITS                indirect:     1;
                BITS                regvar:       1;  ─110
103 ─ /*3*/     BITS                unused:       1;  ─111
                VTPOINTER   name;
                DYNTYPE             location;
104 ─ /*4*/     DNTTPOINTER type;
                unsigned long       offset;       18; ─112
        };
```

FIG 2A (PRIOR ART)

```
106 ─ struct          DNTT_VAR (
100 ─ /*1*/           BITS          extension:   1;  ─107
                      KINDTYPE      kind:       10;  ─108
101 ─ /*2*/           BITS          public:      1;  ─109
102 ─ /*3*/           BITS          indirect:    1;  ─110
103 ─ /*4*/           BITS          regvar:      1;  ─111
                      BITS          dummy:       1;  ─213
104 ─ /*5*/           BITS          range:       1;  ─214
                      BITS          unused:     16;  ─112
                      VTPOINTER     name;
                      DYNTYPE       location;
                      DNTTPOINTER   type;
                      unsigned long offset;
205 ─                 unsigned long range_index;
         };
```

FIG 2B

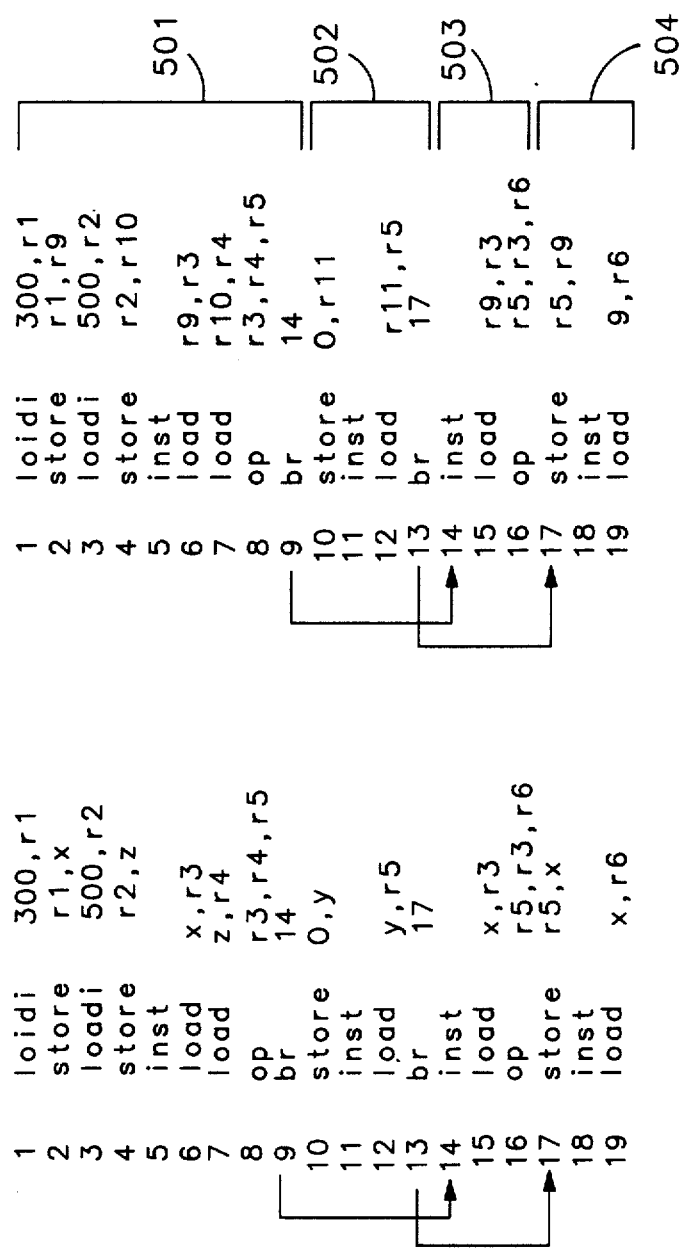

| | | | |
|---|---|---|---|
| 1 | loadi | 300,web1 | l1ws = empty |
| 2 | store | web,web2 | l1ws = web1 |
| 3 | loadi | 500,web3 | l1ws = web2 |
| 4 | store | web3,web4 | l1ws = web2,web3 |
| 5 | inst | | l1ws = web2,web4 |
| 6 | load | web2,web5 | l1ws = web2,web4 |
| 7 | load | web4,web5 | l1ws = web2,web4,web5 |
| 8 | op | web5,web6,web7 | l1ws = web2,web4,web5,web6 |
| 9 | br | 14 | l1ws = web2,web5,web7 |
| 10 | store | 0,web8 | l1ws = web2,web7 |
| 11 | inst | | l1ws = web8 |
| 12 | load | web8,web7 | l1ws = web8 |
| 13 | br | 17 | l1ws = web7 |
| 14 | inst | | l1ws = web2,web7 |
| 15 | load | web2,web9 | l1ws = web2,web7 |
| 16 | op | web7,web9,web10 | l1ws = web7,web9 |
| 17 | store | web7,web11 | l1ws = web7 |
| 18 | inst | | l1ws = web11 |
| 19 | load | web11,web10 | l1ws = web11 |

METHOD AND APPARATUS USING VARIABLE RANGES TO SUPPORT SYMBOLIC DEBUGGING OF OPTIMIZED CODE

BACKGROUND

The present invention is concerned with debugging code which has been compiled using an optimizing compiler.

Code is generally written in a high level programming language. This high level language, often referred to as source code, is translated by a compiler program into an assembly language. The binary form of the assembly language, called object code, is the form of the code actually executed by a computer.

Code debuggers are programs which aid a programmer in finding errors in code. They are extremely useful tools for improving the efficiency of the code debugging process. Many code debuggers supply information pertaining to operation of the code on the assembly code level. If the original code is written in a higher level language, however, this makes program debugging a difficult operation. When a programmer writes his program in a high level language, he does not want to search for the appearance of these errors in the assembly code.

To avoid this problem, it is desirable to develop debugger programs which allow a programmer to debug his program with reference to the level of code in which he originally wrote the program. Such a debugger program is often called a source-level debugger.

One of the important features of a code debugger is to allow a programmer to stop the execution of code and to check the values in each user resource the code is operating upon. A user resource is typically a variable defined in the source code. The values in the user resources give clues to indicate the source of trouble when a program is not operating correctly.

Since the computer operates on object code, a source level debugger needs to know where user resources named in the source code are actually stored by the computer during operation, so that when a user requests the current value for a user resource, the debugging program knows where to find the user resource. Typically, a compiler will allocate a storage location for the user resource where the user resource is always stored. In this case, the debugger need simply go to the location and access the value of user resource.

Difficulties arise when compilers are used which generate optimized code. Usually the design goal of an optimizer within a compiler, is to generate code that executes as fast as possible. In optimized code it may be desirable not to store a user resource in the same place all the time. For instance, if a user resource is accessed often and/or modified often in a particular section of code, during execution of that particular section of code the current value of a user resource may be stored in a register which is accessed and updated, without concurrent update of any other storage location. A standard debugging program, therefore, would have no way of accessing this user resource during execution of the particular section. Thus a programmer is forced to return to attempting to debug code based on the object code, or to use some other method.

SUMMARY OF THE INVENTION

In accordance with the preferred embodiment of the present invention a method and apparatus are presented which uses variable ranges to support symbolic debugging of optimized code. A debug symbol table is constructed which includes descriptions of each user resource in source code. Additionally, a range table is constructed. The range table contains, for each user resource which is stored in numerous locations during execution of the code, a list of ranges and a description of where the user resource may be found during each range. If the user resource is stored as a constant during a particular range, the value of the constant may be stored in the range table. The description of each user resource in the debug symbol table includes a flag which indicates whether there is a list of ranges in the range table for a particular user resource. If there is, the description of the particular user resource will include a pointer to the list of ranges for that user resource. The pointer may, for example, be an index into the range table for the appropriate list.

BRIEF DESCRIPTION OF THE DRAWINGS

FIG. 2A shows a prior art structure which would be found within a data debugger table such as that shown in FIG. 1B.

FIG. 2B shows the structure disclosed in FIG. 2A modified in conformance with the preferred embodiment of the present invention.

FIG. 4 shows a section of non-optimized code generated by a compiler.

FIG. 5 shows the section of code shown in FIG. 4 after a code optimizer has performed register promotion.

FIG. 6 shows the section of code shown in FIG. 5, being used to build an interference graph.

DESCRIPTION OF THE PREFERRED EMBODIMENT

Figure 1A:
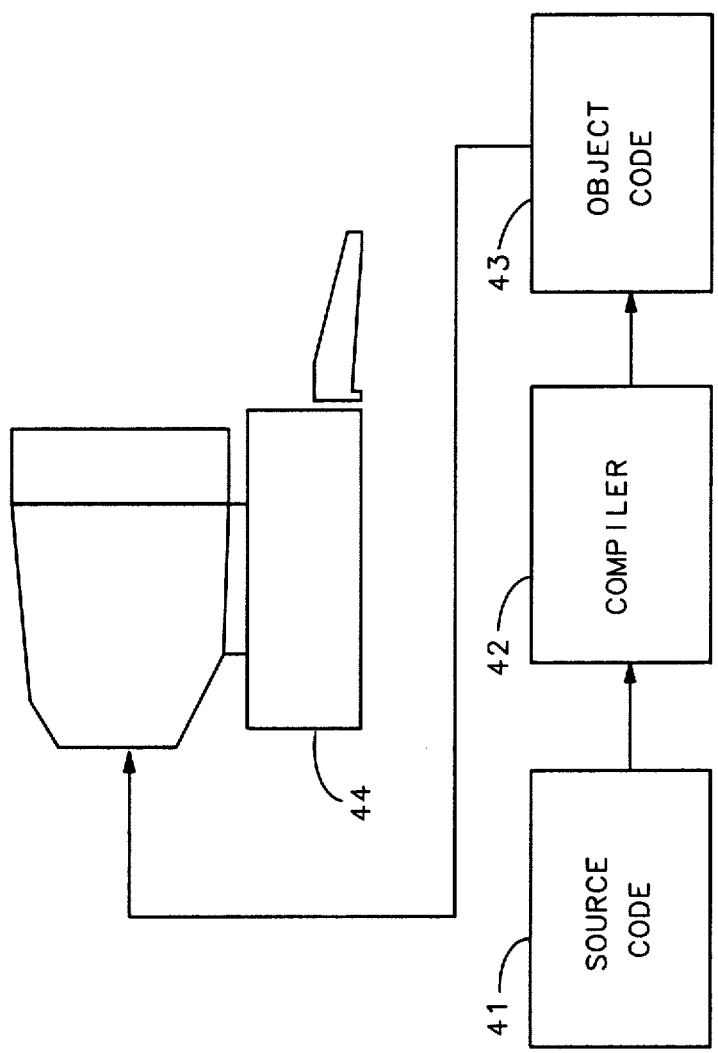
FIG. 1A shows a computing system in which source code is compiled into object code before being run on a computer.

In FIG. 1A, a compiler 42 receives source code 41 and produces object code 43. The object code is run on a computer 44.

Figure 1B:
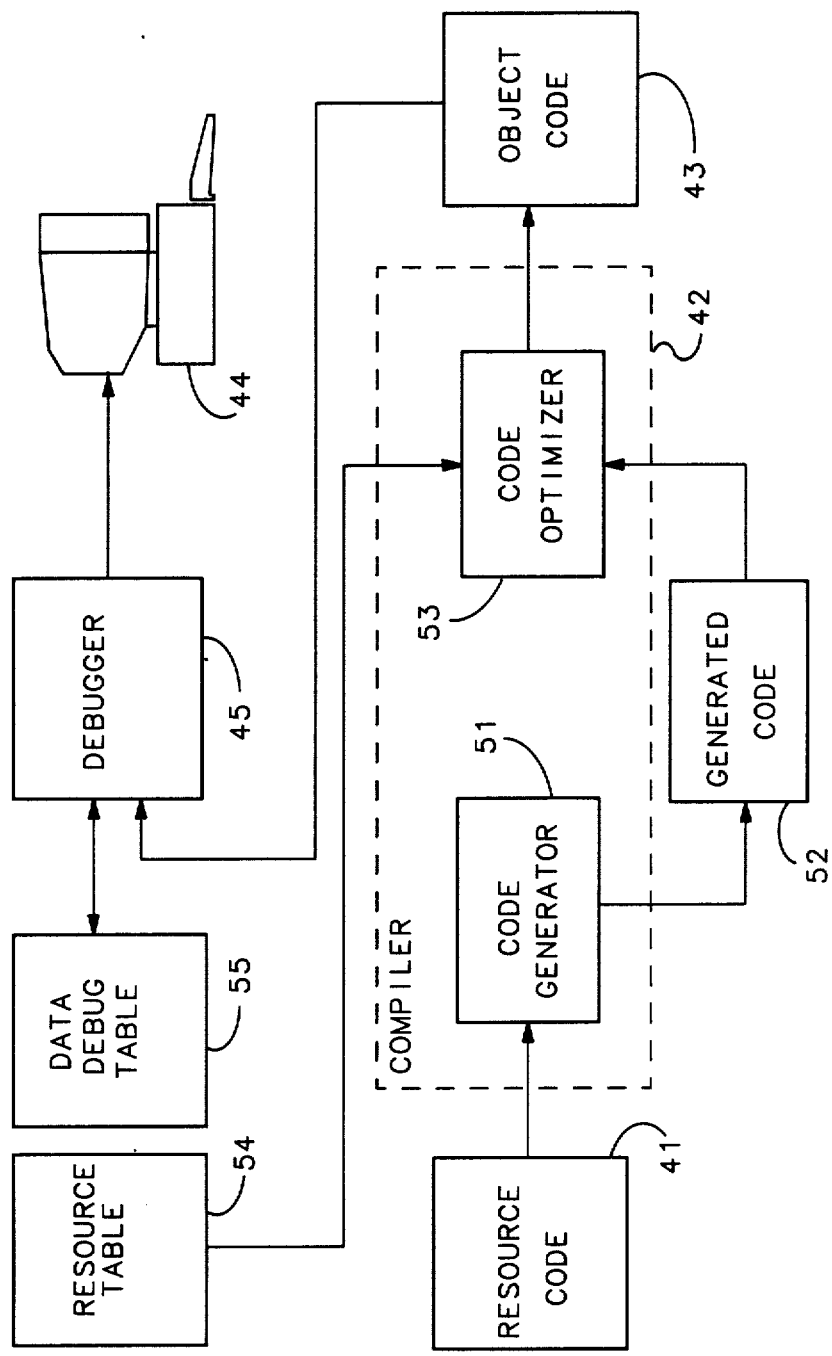
FIG. 1B shows the computing system of FIG. 1A with the addition of a debugger.

In FIG. 1B, in order to discover errors in source code 41, a debugger 45 running on computer 44 executes object code 43. During debugging, debugger 45 accesses a debug symbol table 55. Compiler 42 is shown to include a code generator 51 which generates generated code 52. A code optimizer 53 within compiler 42 optimizes generated code 52 to produce object code 43. Code optimizer 53 is a multi-pass global optimizer. Code optimizer 53 keeps track of memory locations and registers through a resource table 54. Each memory location and register has a unique entry in resource table 54. Herein, memory locations are sometimes referred to as memory resources and registers are sometimes referred to as register resources, and memory locations and registers are sometimes collectively referred to as resources.

For each user resource within source code 41, debugger 45 keeps in debug symbol table 55 a data structure. These data structures are entries within debug symbol table 55. A prior art format of the data structure is shown in FIG. 2A. In FIG. 2A a data structure 106 is comprised of a thirty-two bit word 100, a thirty-two bit word 101, a thirty-two bit word 102, a thirty-two bit word 103 and a thirty-two bit word 104.

Word 100 includes various fields which indicate information about the user resource. A one-bit field 107 stores information which informs the debugger as to size parameters of structure 106. A ten-bit field 108 indicates to debugger 45 what type of structure structure 106 is. For instance, field 108 may indicate to debugger 45 that structure 106 contains a dynamic variable. A one-bit field 109 indicates whether the resource defined by structure 106 is globally recognized in source code 41. A one-bit field 110 indicates whether certain addresses are indirect or direct. A one-bit field 111 indicates whether the resource is a register type, or a dynamic variable. Eighteen bit field 112 is unused.

Word 101 contains a pointer, for instance an actual address or an index, which points to a location in memory in which is kept a name for the resource. The name is how the resource is addressed in source code 41. Word 102 contains a pointer indicating where in memory the resource is stored. Word 103 points to a location in which is stored information about the type of resource. Word 104 contains a post indirection byte offset for use in COBOL structures.

In FIG. 2A, debugger 45 always expects to find the resource defined by structure 106 in the same place. As discussed before, this is sufficient only if compiler 42 is not an optimizing compiler.

FIG. 2B shows prior art structure 106 modified in accordance with the preferred embodiment of the present invention. Word 101, word 102 word 103 and word 104 remain unchanged. In word 100, a one-bit field 213, and a one-bit field 214 have been added. Field 213 is a pad so that field 214 is in a position that is more convenient for access by debugger 45. Field 214 is reset when there is no range table associated with the resource defined by structure 106. Field 214 is set when there is a range table associated with the resource defined by structure 106.

Additionally, in FIG. 2B, a word 205 is added. When field 214 is set, word 205 contains an index into a range table. The index points to the first range for the resource defined by structure 106.

Figure 3:
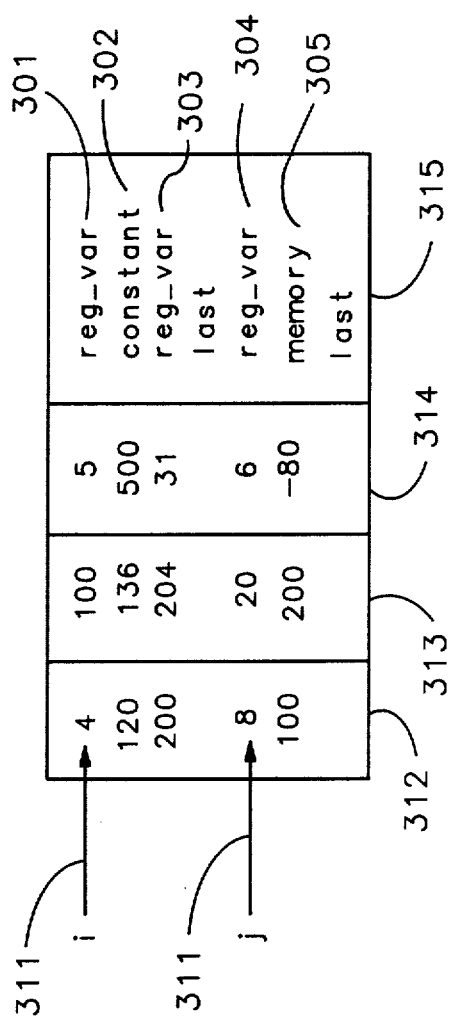
FIG. 3 shows a range table in accordance with the preferred embodiment of the present invention.

FIG. 3 shows a range table in accordance with a preferred embodiment of the present invention. Pointers 311 from debug symbol table, for user resources i and j point to ranges within the range table. A column 312 contains low bounds for ranges for user resources i and j. A column 313 contains high bounds for ranges for user resources i and j. A column 314 locations for user resources i and j. A column 315 contains flags indicating information about each range.

For instance, a range 301, a range 302 and a range 303 give information about a user resource "i". From program location 4 to program location 100, user resource i is stored as a register resource in register 5. From program location 120 to program location 136, user resource i is stored as a constant with a value of 500. From program location 200 to program location 204 user resource i is is stored as a register resource in register 31. This is the last range for user resource i. For the program locations not given in the range table, the value for user resource i is unavailable.

Similarly, a range 304 and a range 305 give information about a user resource "j". From program location 8 to program location 2C, user resource j is stored as a register resource in register 6. From program location 100 to program location 200 user resource j is stored in a memory stack at location −80 on the stack. This is the last range for user resource j. For the program locations not given in the range table, the value for resource is unavailable.

If therefore data structure 106 were describing user resource i, then field 214 would be set and word 205 would contain an index pointing to range 301. If the data structure 106 were describing user resource j, then field 214 would be set and word 205 would contain an index pointing to range 304. Field 112 has been reduced to sixteen unused bits.

The following is an explanation of how ranges are calculated when code optimizer 53 optimizes generated code 52. In FIG. 4 is shown an example of generated code produced by code generator 51. The code in FIG. 4 contains three user resources: user resource x, user resource y, and user resource z. It is a goal of this discussion to show how ranges for these user resources may be calculated when code optimizer 53 optimizes generated code 52.

FIG. 5 shows generated code 52 of FIG. 4 after code optimizer makes a register promotion pass. The code is broken up into four basic blocks: a block 501, a block 502, a block 503 and a block 504. A basic block is a straight-line code sequence with a single entry point and a single exit point.

During the register promotion pass, code optimizer calculates webs for each register or memory location used by generated code 52. What is meant by a web is a set of instructions which access a particular resource. The web begins when the resource is defined to have a particular value. Every successive instruction that uses the resource is included in the web, until the resource is defined to have a new value. More than one web may be built upon a single resource. This occurs when instructions which define and use the resource are completely disjoint from other instructions which define and use the resource.

Since code runs faster when resources are stored in registers, rather than memory locations, on this pass code optimizer looks for memory resources which can be promoted to register resources. As is apparent from close comparison of FIG. 5 with FIG. 4, user resources x, y and z are promoted from memory resources to registers r9, r10 and r11 respectively. As can be seen in FIG. 5 each store to user resource x is changed into a copy to register r9, each store to user resource y is changed into a copy to register r10 and each store to resource z is changed into a copy to register r11.

The webs generated with regard to the code in FIG. 5 are shown in the following Table 1:

TABLE 1

| Web Number | Instructions | Resource | User Resource Pointer |
|---|---|---|---|
| web 1 | 1, 2 | r1 | Null |
| web 2 | 2, 6, 15 | r9 | x |
| web 3 | 3, 4 | r2 | Null |
| web 4 | 4, 7 | r10 | z |
| web 5 | 6, 8 | r3 | Null |
| web 6 | 7, 8 | r4 | Null |
| web 7 | 8, 12, 16, 17 | r5 | Null |
| web 8 | 10, 12 | r11 | y |
| web 9 | 15, 16 | r3 | Null |
| web 10 | 16, 19 | r6 | Null |
| web 11 | 17, 19 | r9 | x |

It is an object of the present invention to keep track of which webs are concerned with user resources. This information is stored in the form of a field in each resource table entry within resource table 54. For every resource in resource table 54, if there is a user resource associated therewith, the pointer will point to the entry within debug symbol table 55 for the user resource. If there is not a user resource associated with a resource table entry, the pointer will be null. In Table 1 this pointer for each web is represented by the Column labelled "User Resource Pointer".

Figure 5A:
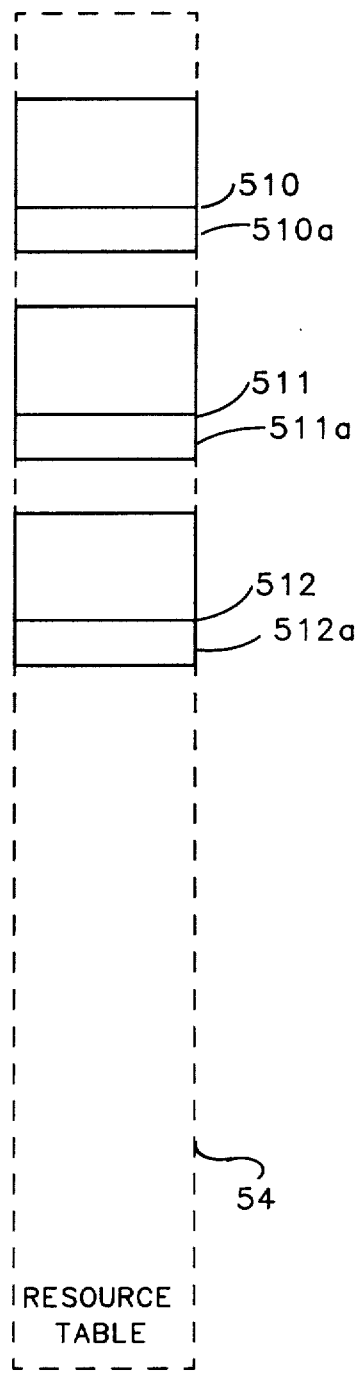
FIG. 5A shows a resource table in accordance with the preferred embodiment of the present invention.

In FIG. 5A, a portion of resource table 54 is shown. An entry 510 for user resource x includes a pointer 510a which points to an entry for user resource x in debug symbol table 55. An entry 511 for user resource y includes a pointer 511a which points to an entry for user resource y in debug symbol table 55. An entry 512 for user resource z includes a pointer 512a which points to an entry for user resource z in debug symbol table 55.

Figure 5B:
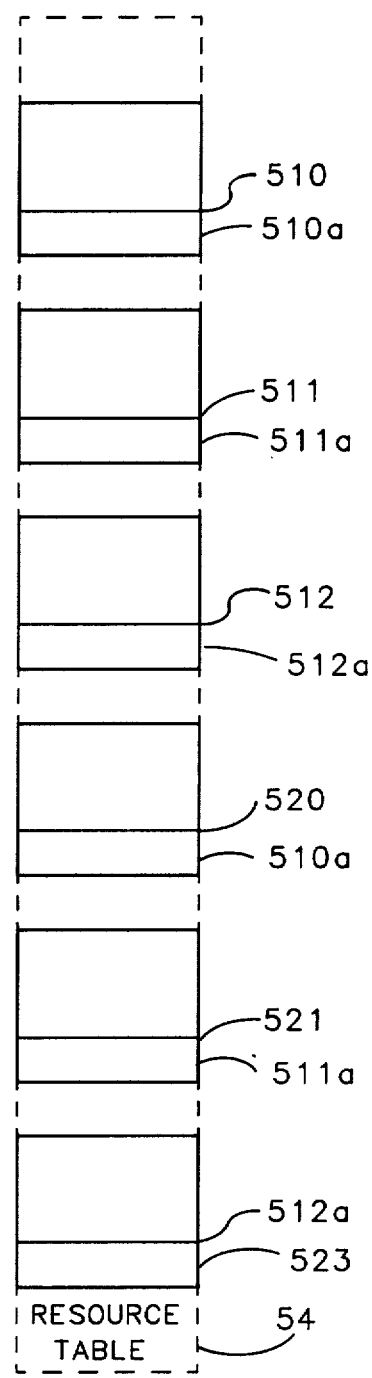
FIG. 5B shows the resource table of FIG. 5A after certain user resources have been promoted to registers.

FIG. 5B shows resource table 54 after the register promotion pass. Entries 510, 511 and 512 remain in resource table 54 unchanged. A new entry 520, a new entry 521 and a new entry 522 have been added to resource table 54. Entry 520 for register r9 includes pointer 510a which points to the entry for user resource x in debug symbol table 55. Entry 521 for register r11 includes pointer 511a which points to the entry for user resource y in debug symbol table 55. Entry 522 for register r10 includes pointer 512a which points to the entry for user resource z in debug symbol table 55.

In addition, during the register promotion pass, code optimizer 53 calculates the set of webs which are alive at the end of each of the basic blocks. What is meant by a web being alive at the end of a particular basic block, is that the current value of the resource associated with the web is need by other basic blocks which are executed subsequent to the particular basic block. For the code in FIG. 5, the following Table 2 shows which webs are alive at the end of blocks 501, 502, 503 and 504.

TABLE 2

| Basic Block | Live Webs |
|---|---|
| Block 501 | web 2, web 7 |
| Block 502 | web 7 |
| Block 503 | web 7, web 10 |
| Block 504 | web 10 |

Code optimizer 53 makes another pass to determine interferences between webs. The results of the pass are shown in FIG. 6. In FIG. 6, each resource is replaced by the web associated with it in Table 1. Additionally, for each instruction the local live web set (llws) is calculated for each instruction. The llws for each instruction is that set of webs which is currently active during the execution of that instruction. The llws for each instruction is calculated as follows. Code optimizer 53 traverses instructions in each of blocks 501-504 in reverse order. The llws for the last instruction in each block is the set of live webs given in Table 2. While traversing the instructions in each block in reverse order whenever code optimizer 53 encounters a web not in the current llws, code optimizer 53 adds the web to the llws. When code optimizer 53 comes across a definition for a web, the web is removed from the llws. The llws which exists after each instruction is processed is shown in FIG. 6.

From the information derived during this pass it is determined interferences between webs, that is, which webs are alive during the time other webs are alive. The following Table 3 shows web interferences for the code in FIG. 6.

TABLE 3

| Web | Interfering Webs |
|---|---|
| web 1 | |
| web 2 | web 3, web 4, web 5, web 6, web 7 |
| web 3 | web 2 |
| web 4 | web 2, web 5 |
| web 5 | web 2, web 4 |
| web 6 | web 2, web 5 |
| web 7 | web 2, web 9, web 10 |
| web 8 | |
| web 9 | web 7 |
| web 10 | web 7 |
| web 11 | |

The same information which code optimizer 53 uses to build the interference graph, may also be used to calculate information on ranges. Ranges may be calculated as follows.

In Table 1 certain webs have pointers to a user resource entry in debug table 55. Information about these webs, are used to calculate ranges for their associated user resources. In calculating these ranges high-water marks and low water marks are used. A high water mark is the instruction before a high bound of a range. A low water mark is the instruction before a low bound of a range.

If at the end of a block a web is still in the llws, the last instruction is a high water mark for the user resource associated with that web. Also, at the point where, code optimizer 53 adds a web to the llws, while traversing the instructions in each block in reverse order, this instruction also is considered a high water mark for the user resource associated with that web.

Similarly, when a web is removed from the llws, that instruction is considered a low water mark for the user resource associated with that web. Also the top of a block may be considered a low water mark for any user resource. The above-given system can be improved when the blocks themselves (in addition to the code within each block) are traversed in reverse order. In this case, if a web is in the llws at the end of the next-to-be traversed block, it is not necessary to place a low water mark at the top of the most recently traversed block.

Figure 7:
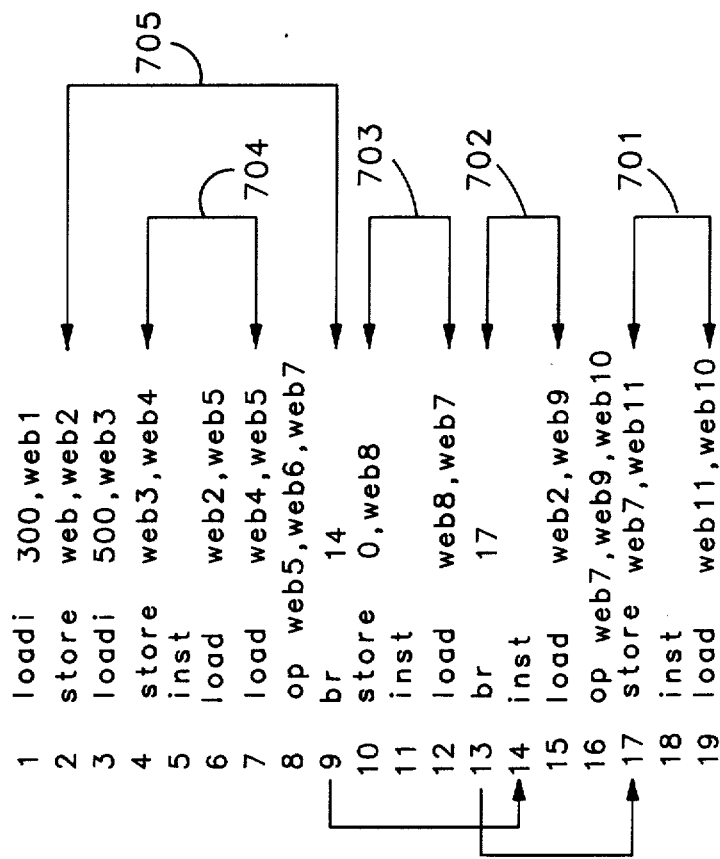
FIG. 7 shows the section of code shown in FIG. 6 after calculation of ranges in accordance with the preferred embodiment of the present invention.

Using FIG. 6 and FIG. 7 it is possible to see how the method of determining ranges described above, may be performed on the code shown in FIG. 6. Starting with instruction 19, web11 is in the llws. As can be seen from Table 1, web11 has a user resource pointer to user resource x. Therefore, instruction 19 is a high water mark for user resource x. In instruction 17, web11 is defined, and therefore removed from the llws. Therefore, instruction 17 is a low water mark for user resource x. A high bound and a low bound for Range 701 for user resource x may be determined from the high water mark and the low water mark given.

In instruction 15, web2 is used and it is not currently in the llws, therefore it is the last use of web2. From Table 1, web2 has a user resource pointer to user resource x. Therefore, instruction 15 is a high water mark for user resource x. Instruction 14 is the top of block 503. Web2 is not in the llws at the end of block 502. Therefore, instruction 14 is a low water mark for user resource x. Range 702 for user resource x may be determined from the high water mark and the low water mark.

In instruction 12, web8 is used and it is not currently in the llws, therefore it is the last use of web8. From Table 1, web8 has a user resource pointer to user resource y. Therefore, instruction 12 is a high water mark for user resource y. In instruction 10, web8 is defined. Therefore instruction 10 is a low water mark for user resource y. Range 703 for user resource x may be determined from the high water mark and the low water mark.

Instruction 9 is the end of block 501. Web2 is in the llws in instruction 9 at the end of block 501. From Table 1, web2 has a user resource pointer to user resource x. Therefore, instruction 12 is a high water mark for user resource x.

In instruction 7, web4 is used and it is not in the llws, therefore it is the last use of web4. From Table 1, web4 has a resource pointer to user resource z. Therefore, instruction 7 is a high water mark for user resource z. In instruction 4, web4 is defined. Therefore, instruction 4 is a low water mark for user resource z. Range 704 for user resource z may be determined from the high water mark and the low water mark.

In instruction 2, web2 is defined. Therefore, instruction 2 is a low water mark for user resource x. Range 705 for user resource x may be determined from the high water mark and the low water mark. At this point a range table could be constructed, as is shown in FIG. 7A.

Figure 7A:
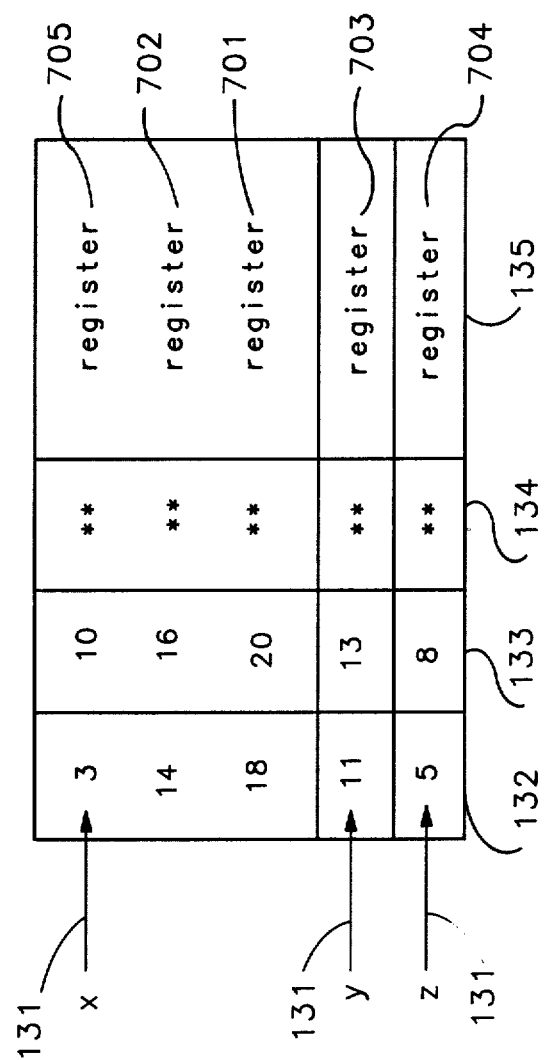
FIG. 7A shows a range table which could be developed as a result of the ranges determined in FIG. 7 in accordance with the preferred embodiment of the present invention.

In FIG. 7A pointers 131 from debug symbol table point to ranges within the range table. The ranges are for user resources x, y and z. A column 132 contains low bounds for ranges for user resources x, y and z. A column 133 contains high bounds for ranges for user resources x, y and z. A column 134 contains a location for the user resource for the respective ranges. A column 135 indicates the type of resource in which user resource resides during the given range. Information about the ranges are associated with the respective webs. For instance, this may be done by adding a list of ranges to a data structure built and used by a portion (called a register allocator) of code optimizer 53 which allocates registers. The data structure built by the allocator is called an interference graph. Each web has a separate entry. The list of ranges for each web is added to the web's entry in the interference graph.

When code optimizer 53 makes additional passes in the code, the ranges may need to be adjusted accordingly. For instance, code optimizer 53 may perform a copy elimination. A copy elimination may be performed when code optimizer 53 determines that two webs do not interfere, but share a copy instruction in common. The copy is removed and the two webs become a single composite web.

Figure 8:
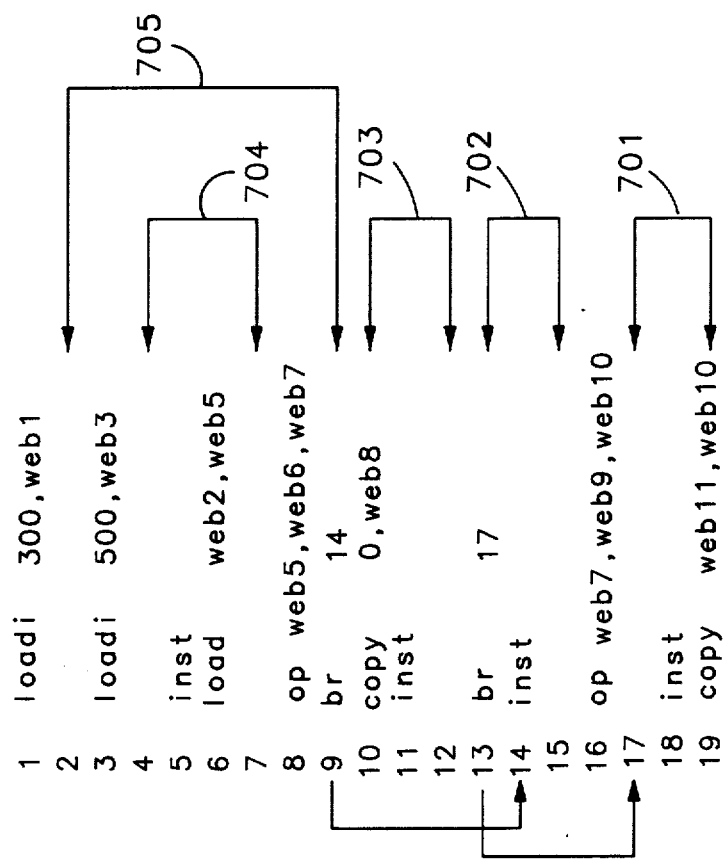
FIG. 8 shows the section of code shown in FIG. 7 after an optimizer has performed copy eliminations.

If a web is removed which is associated with a user resource, the list of ranges for the removed web must be added to the composite web. FIG. 8 shows the code of FIG. 7 after code optimizer 53 performs copy elimination. The following Table 4 shows the necessary modifications to Table 1, resulting from the copy elimination:

TABLE 4

| Web Number | Instructions | Resource | User Resource Pointer |
|---|---|---|---|
| web 1:web 2 | | | |
| web 2:web 9 | | | |
| web 3:web 4 | | | |
| web 4:web 6 | | | |
| web 5 | 6, 8 | r3 | Null |
| web 6 | 7, 8, 3, 4, 4, 7 | r4, r2, r10 | z |
| web 7:web 11 | | | |
| web 8:web 7 | | | |
| web 9 | 15, 16, 2, 6, 15, 1, 2 | r3, r9, r1 | x |
| web 10 | 16, 19 | r6 | Null |
| web 11 | 17, 19, 8, 12, 16, 17, 10, 12 | r9, r5, r11 | x, y |

Figure 9:
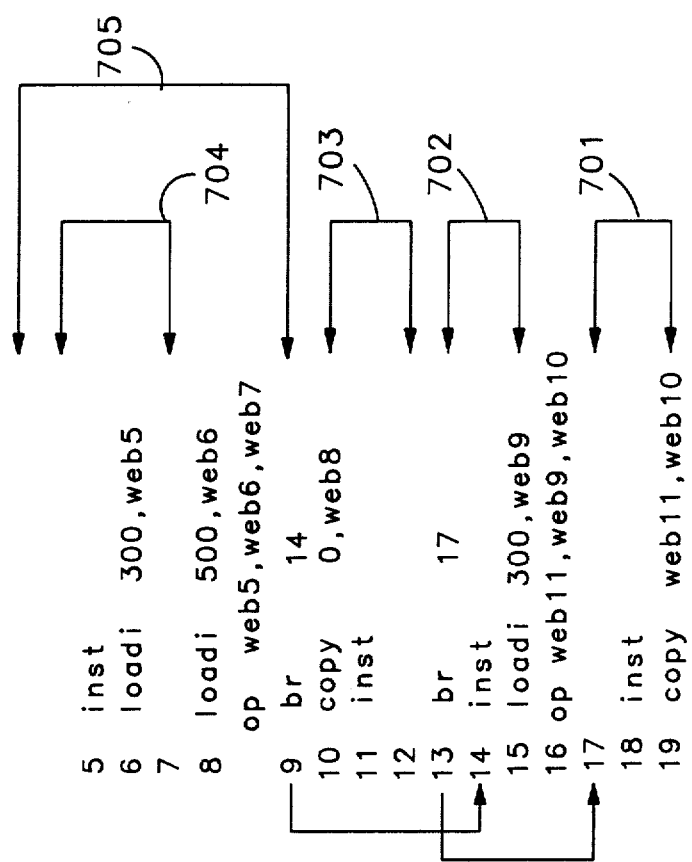
FIG. 9 shows the section of code shown in FIG. 8 after ranges for constants have been spilled.
Figure 9A:
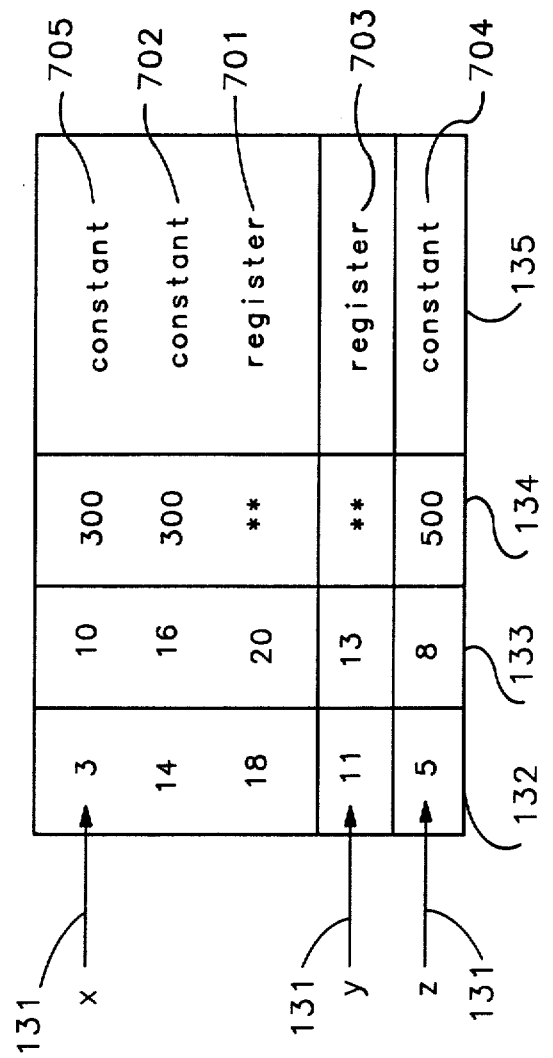
FIG. 9A shows the range table shown in FIG. 7A after it has been modified to take into account the changes to the code as recorded in FIG. 9 in accordance with the preferred embodiment of the present invention.

Code optimizer 53 may also perform a constant spill. For instance, if a web contains only a constant variable, code optimizer 53 may determine that it is advantageous to free up a register by reloading the constant into a register before each use, rather than leaving the constant continually in the register. In this case the ranges, which previously were of type register range, are changed to type constant range. The location of the user resource is changed to equal the constant. FIG. 9 shows how the code of FIG. 8 is modified after code optimizer 53 performs a constant spill. FIG. 9A shows how the range table showed in FIG. 7A would be modified as a result of the constant spill.

Figure 10:
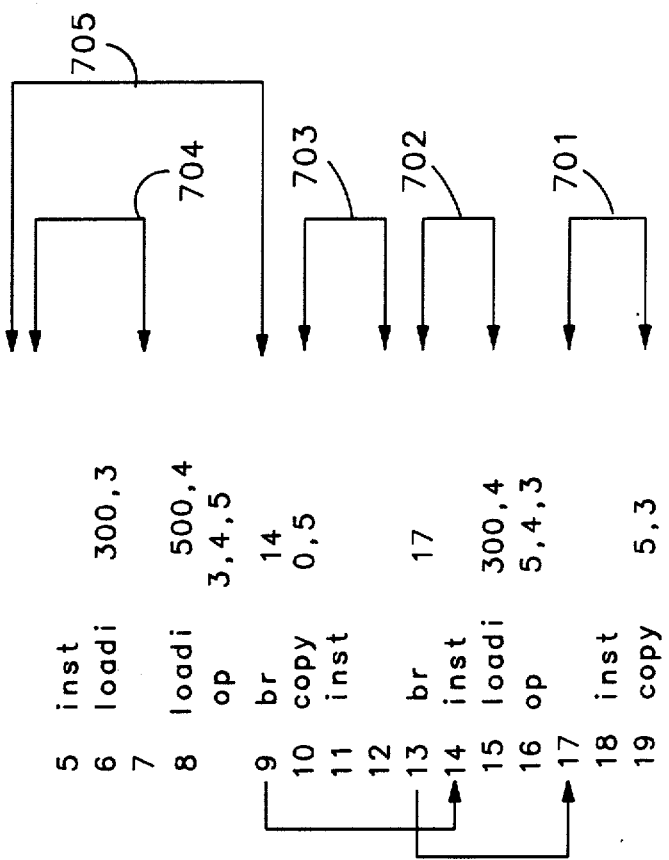
FIG. 10 shows the section of code shown in FIG. 9 after registers have been assigned.
Figure 10A:
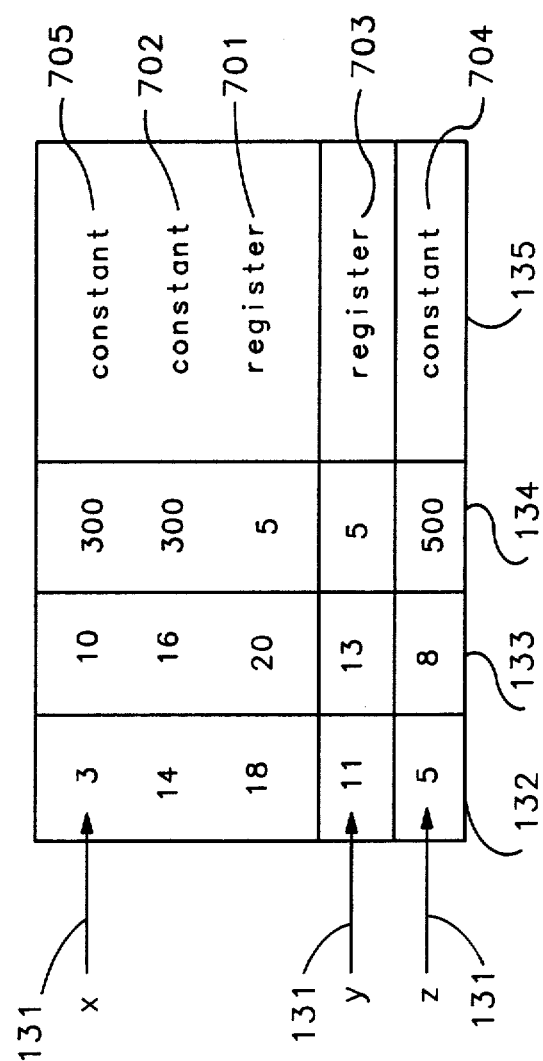
FIG. 10A shows the range table shown in FIG. 9A after it has been modified to take into account the changes to the code as recorded in FIG. 10 in accordance with the preferred embodiment of the present invention.

At this point code optimizer 53 allocates registers to webs. FIG. 10 shows the code of FIG. 9 after registers have been allocated. Once registers are allocated to webs, the information about those registers may be filled into the range table. FIG. 10A shows the range table of FIG. 9A after register allocation.

If, during the register allocation, there are not sufficient registers, code optimizer 53 spills some of the webs to memory. A spilled web is stored to memory after being defined, and reloaded before it is used. When this occurs entries in the range table are changed to spill ranges. The low water mark and high water mark remain the same, but the location is changed to the spill memory location and the type of range is changed to spill.

The ranges can often be expanded by making another pass. The high water mark may be moved to the end of a basic block or to an instruction that might wipe out the contents of the register in which the user resource resides, whichever first occurs.

In order to do this, the code is again traversed in reverse order, keeping track of the last instruction of the basic block as an extend instruction for each web. A set of flags keeps track of the registers defined between the current instruction and the last instruction of the basic block. When a definition of a register is seen, the flag for the appropriate register is set and a pointer to the defining instruction is attached to the web. The defining instruction becomes a new extend instruction for that web.

When an instruction performing a call is seen, the call instruction becomes the extend instruction in all the webs. This is because a call could wipe out the values in any register.

When the use of a web is seen, if the register assigned to that web had been defined before the last instruction, that instruction becomes the extend instruction for that web.

When the traverse is finished, for those webs which contain a range whose high water mark is lower than the extend instruction, the extend instruction becomes the new high water mark, and the range is adjusted accordingly.

Figure 11:
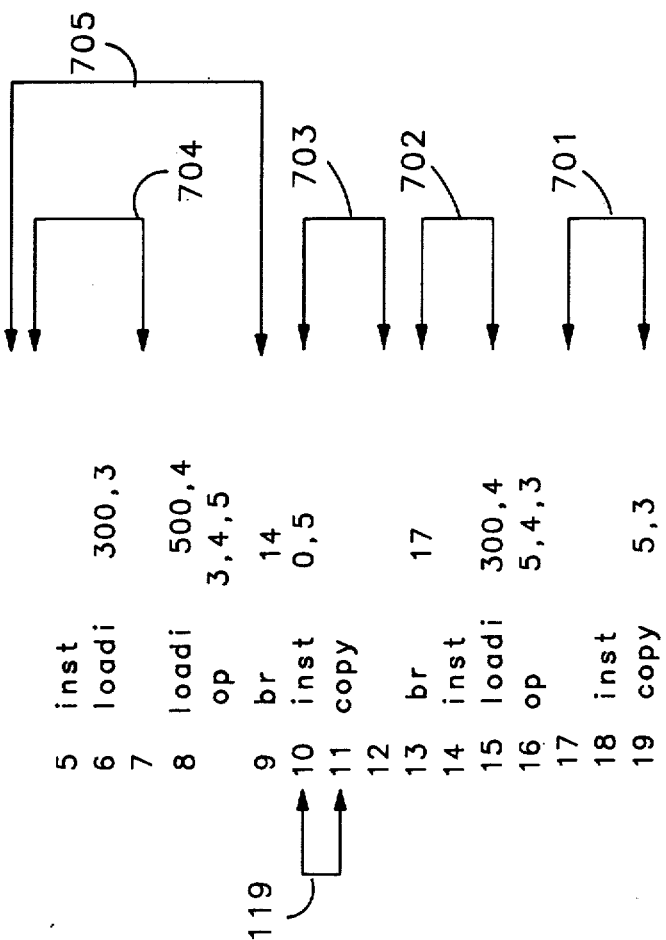
FIG. 11 shows the section of code shown in FIG. 10 after a scheduler has switched the location of execution of two instructions.
Figure 11A:
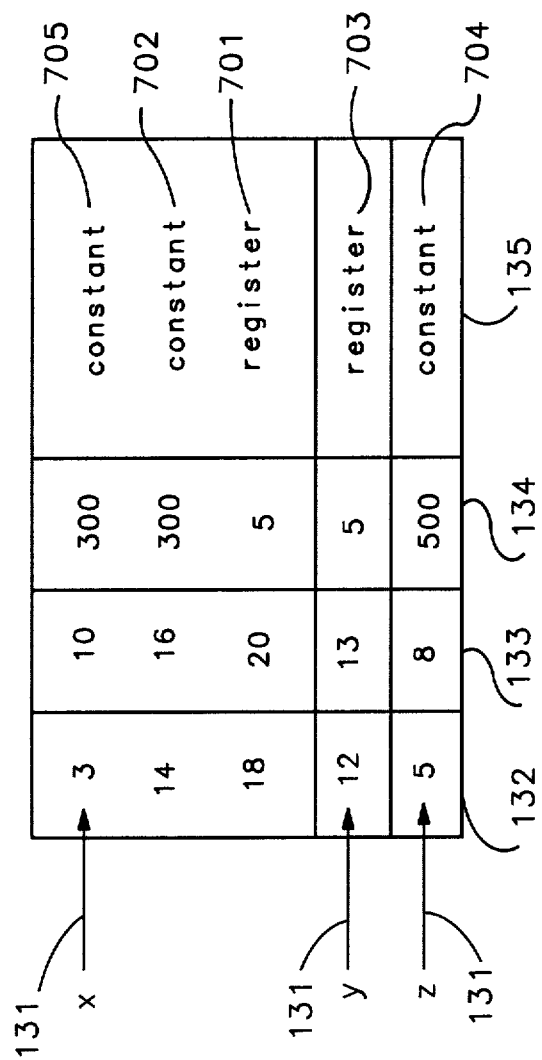
FIG. 11A shows the range table shown in FIG. 10A after it has been modified to take into account the changes to the code as recorded in FIG. 11 in accordance with the preferred embodiment of the present invention.

Finally, additional functional units within code optimizer may operate on the code to produce ranges which overlap existing ranges. In this case the range with the lowest priority must be shortened. For example, in FIG. 11, a scheduler within code optimizer 53 has reversed the operations of instructions 11 and instruction 10. This has created a scheduler range 119 which overlapped range 703. Range 703 was created first, so has the lowest priority. Therefore, range 703 was shortened. FIG. 11A shows how the range table shown in FIG. 10A is modified to reflect the shortening of range 703.

We claim:

1. In a computing system having a memory, the computing system including a debugger which is used to debug compiled code generated by a compiler from source code, wherein the debugger accesses in the memory a debug symbol table generated by the computer system during compilation of the compiled code, the debug system table containing a plurality of debug symbol table entries, each debug symbol table entry in the plurality of debug symbol table entries describing a user resource used by the source code, an improvement to the computing system comprising:
a range table generated by the computing system during compilation of the compiled code, the range table being in the memory, separate from the debug symbol table and accessed by the debugger, the range table including a list of ranges for each resource of a subset of user resources described in the debug symbol table, each list of ranges for a user source including
at least one range of instructions for execution by the computing system, and
for each of the at least one range of instructions, a location where the user resource resides in the computing system when the computing system executes the at least one range of instructions;
wherein each dubug symbol table entry which describes a user resource from the subset of user resources includes a pointer into the range table which identifies a list of ranges for the user resource.

2. A computing system as in claim 1
wherein the range table does not include a list of ranges for all user resources;
wherein the plurality of debug symbol table entries includes a first subset of debug symbol table entries which describe user resources for which the range table includes a list of ranges and the plurality of debug symbol table entries includes a second subset of debug symbol table entries which describe user resources for which the range table does not include a list of ranges; and,
wherein, each entry within the plurality of debug symbol table entries contains a field which indicates whether the entry is in the first subset of entries or the second subset of entries.

3. A computing system as in claim 2 wherein each debug symbol table entry in the second subset of debug symbol table entries contains a pointer which indicates a location in the computing system where a user resource described by the debug symbol table entry resides when the computing system executes the compiled code.

4. A method for determining and recording, during optimization of computer programming code compiled for execution on a computing system, ranges of instructions within the computer programming code for which user resources reside in certain locations within the computing system, the method comprising the following steps performed by a computer of:
(a) dividing the computer programming code up into basic blocks of straight line code sequences of instructions with a single entry point and a single exit point;
(b) calculating webs for each user resource;
(c) determining a range of instructions within each basic block when webs for each user resource are alive;
(d) allocating, for each determined range of instructions for each web, locations in which user resources are stored; and,
(e) storing in a table a description of allocated locations for each determined range of instructions.

5. A method as in claim 4, wherein after step (c) the determined range of instructions for some webs is extended by the following steps:
(c1) combining a first range of instructions for a first web with a second range of instructions for the first web when the first range of instructions is in a first basic block of computer programming code and the second range of instructions is in a second basic block of computer programming code which immediately follows the first basic block of computer programming code, and when the first web is alive at the last instruction of the first basic block and is alive at the first instruction of the second basic block, and wherein the first range of instructions and the second range of instructions are combined into a third range of instructions which includes all the instructions in the first range of instructions and the second range of instructions.

6. A method as in claim 4, additionally comprising the step of:
(f) storing in the table a constant value for every user resource which is stored as a constant.

7. A method as in claim 4, additionally comprising the step of:

(f) changing the description of an allocated location of a user resource for a determined range of instructions when said allocated location in which the user resource is stored is changed for that determined range of instructions.

8. A method as in claim 4 additionally comprising the step of:
(f) redetermining a first range of instructions which use a first user resource when a second range of instructions uses the first resource and overlaps the first range of instructions, and when the second range of instructions has a higher priority than the first range of instructions.

9. A method as in claim 4 wherein after step (b) is added to the following steps:
(b1) combining a first web for a first user resource with a second web for a second resource into a composite web when the first web and the second web share a copy instruction; but do not interfere with each other;
(b2) substituting the composite web for the first web and for the second web as the calculated web for the first user resource and for the second user resource.

10. In a computing system which includes a debugger which is used to debug compiled code generated by a compiler from source code, an improvement to the computing system comprising:
a resource table generated by the computer system during compilation of the compiled code, the resource table including a plurality of resource table entries, the entries describing resources in the compiled code;
a debug symbol table generated by the computer system during compilation of the compiled code, the debug symbol table including a plurality of debug symbol table entries, each debug symbol table entry including data which describes a resource in the source code, wherein when a first resource table entry from the plurality of resource table entries describes a first resource in the compiled code which is equivalent to a first resource in the source code, the first resource table entry will contain a pointer which points to a first debug symbol table entry which describes the first resource in the source code; and,
a range table generated by the computing system during compilation of the compiled code, the range table including a range list for at least one of the resources in the source code, the range list including at least one range of instructions executable by the computing system, and for each of the at least one range of instructions, a location where the resource resides in the computing system when the computing system executes the at least one range of instructions,
wherein when a first range list for the first resource in the source code is in the range table, the first debug symbol table entry will contain a pointer which points to the first range list.

* * * * *